United States Patent
van Bckkum et al.

(10) Patent No.: US 6,382,033 B1
(45) Date of Patent: May 7, 2002

(54) SOUND DAMPER FOR ULTRASONIC WAVES

(75) Inventors: Jan Aart van Bckkum, Hoornaar; Nico Roosnek, Den Haag, both of (NL)

(73) Assignee: Krohne Mebtechnik GmbH & Co. KG (DE)

( * ) Notice: Subject to any disclaimer, the term of this patent is extended or adjusted under 35 U.S.C. 154(b) by 0 days.

(21) Appl. No.: 09/525,849

(22) Filed: Mar. 15, 2000

Related U.S. Application Data

(63) Continuation of application No. 09/290,418, filed on Apr. 13, 1999, now abandoned, which is a continuation of application No. 08/948,107, filed on Oct. 9, 1997, now abandoned.

(51) Int. Cl.$^7$ ................................................. G01F 1/66
(52) U.S. Cl. ................................................. 73/861.28
(58) Field of Search ...................... 73/861.28, 861.18, 73/861.27, 861.29; 181/247, 249, 265; 417/312

(56) References Cited

U.S. PATENT DOCUMENTS

| | | | | |
|---|---|---|---|---|
| 3,889,776 A | * | 6/1975 | Postma | 181/50 |
| 5,131,278 A | * | 7/1992 | Baumoel | 73/861.18 |
| 5,173,576 A | * | 12/1992 | Feuling | 181/247 |
| 5,777,237 A | * | 7/1998 | Collier et al. | 73/861.28 |
| 5,961,309 A | * | 10/1999 | Harpole et al. | 418/181 |

* cited by examiner

Primary Examiner—Benjamin R. Fuller
Assistant Examiner—Jewell V Thompson
(74) Attorney, Agent, or Firm—Cesari and McKenna, LLP

(57) ABSTRACT

The invention concerns, according to the first teaching, a sound damper for ultrasonic waves in a gas flow, with at least one damping element (3) that can be inserted into a line for the gas flow. In accordance with the invention, the sound damper for ultrasonic waves is characterized by the fact that at least one scattering unit (5, 6, 7) having a number of small reflective surfaces is located in the damping element (3).

2 Claims, 3 Drawing Sheets

SOUND DAMPER FOR ULTRASONIC WAVES

Figure 1:
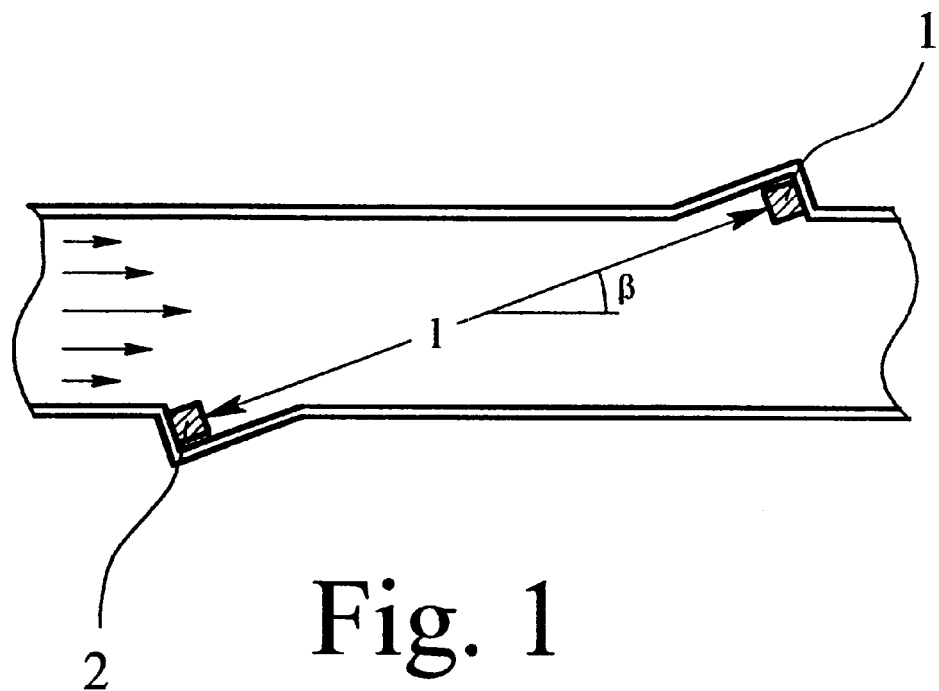

This aplication is a continuation of Ser. No. 09/290,418 filed Apr. 13, 1999 abandoned, which is a continuation of Ser. No. 08/948,107 filed Oct. 9, 1997 abandoned.

The invention concerns, according to a first teaching, a sound damper for ultrasonic waves in a gas flow, with at least one damping element that can be inserted into a line for the gas flow.

Sound dampers for sound waves in the acoustic range (20 Hz–20 kHz) essentially have been known from the prior art for a long time. For example, they are inserted into motor vehicle exhaust gas flows to reduce emissions of sound waves in the acoustic range as much as possible, or even to eliminate them entirely.

In the attempt also to reduce emissions of sound waves in the acoustic range in industrial plants as much as possible, in order to meet environmental protection regulations, throttle valves to control a gas flow, which, instead of emitting sound waves caused by the throttling process in the environmentally-relevant acoustic range, now produce sound waves in the environmentally uncritical ultrasonic range (>20 kHz), especially between 2 kHz and 63 kHz, have recently become known.

Such emission of ultrasonic waves by modem throttle valves, on the one hand, meet the environmental standards, but on the other hand, result in conflicts with flow meters frequently used in control circuits to adjust a gas flow, which operate according to the ultrasonic principle. The ultrasonic waves produced by the modem throttle valves in the known flow meters, which operate on the ultrasonic principle, lead to very considerable malfunctions, up to total failure.

It is therefore a first object of the invention to provide sound dampers in the ultrasonic range, especially for flow meters that work on the ultrasonic principle.

According to the first teaching of the invention, the object set forth and explained previously is solved by locating at least one scattering unit having a plurality of small reflective sudden in the damping element.

The configuration in accordance with the invention guarantees that the ultrasonic waves are reflected very frequently, so that there is a great probability of destructive interference—and hence cancellation—of the ultrasonic waves on the extended acoustic paths, which leads to a good damping of the amplitude of the ultrasonic waves.

If the dimensions of the reflective surfaces vary approximately within the range of the wavelength of the ultrasonic waves, this also guarantees that the largest possible number of reflective surfaces effective for the ultrasonic waves in a given volume can be provided. Reflective sure with dimensions in the range below the wavelength of the ultrasonic waves are not "visible" or only conditionally so, while reflective surfaces in the range above the wavelength of the ultrasonic waves are "visible" for the ultrasonic waves and thus result in reflection, but at the same time take up a lot of space unnecessarily.

The probability of destructive interference connected with the longest possible acoustic paths is particularly high if the reflective faces are oriented irregularly.

A further improvement in the damping of the sound damper for ultrasonic waves in accordance with the invention is guaranteed by the fact that the reflective surfaces of the scattering units are at least partially curved. Such curving of the reflective surfaces leads to the formation of eddies within the gas flow, which also result in a damping of the amplitude of the ultrasonic waves.

If a layer of gauze or a comparable textile material is located on and/or in the damping element, a further reduction in the amplitude of the ultrasonic waves is guaranteed by the plurality of disturbances in the flow of gas through the gauze.

The sound damper for ultrasonic waves in accordance with the invention receives a particularly advantageous refinement when the damping element, comparable with known conventional damping elements for sound waves in the acoustic range, is made of a perforated, tubular body closed at one end. This type of damping element is simple and inexpensive to produce.

Experimentally, a diameter of approximately 20 mm for the holes in the damping element has proven especially advantageous for the damping properties of the sound damper.

In the damping element described, consisting of a perforated, tubular body closed at one end, a scattering unit having the arrangement of at least one open geometric structure pointing from outside to inside on the inside of the damping element has proven particularly advantageous. The open geometric structures can have completely different cross sections. For example, they can be made circular, square, or the like.

The sound damper in accordance with the invention receives a further advantageous refinement when the damping element is filled with a number of scattering units. This measure guarantees that the reflective surfaces are oriented highly irregularly, and the scattering units at the same time do not have to have an exessive complicated structure.

If the damping element is filled with a number of scattering units, so-called pall rings are particularly advantageous as the scattering units. On the one hand, these pall rings have a number of small reflective surfaces, and, on the other hand, these reflective surfaces are arranged in such a way that there is a high probability that eddies causing a further damping of the amplitude of the ultrasonic waves will be generated.

Comparable with sound dampers for sound waves in the acoustic range, it is also particularly advantageous for the sound damper in accordance with the invention to design the damping element adapted to a curved line. The acoustic paths, further elongated by this curvature, lead to an additional damping of the amplitude of the ultrasonic waves.

According to a second teaching, the invention concerns a flow meter which operates on the ultrasonic principle. Such a flow meter is known, for example from D-A-195 30 807.

According to the second teaching of the invention, a known flow meter which operates on the ultrasonic principle is characterized by the fact that a sound damper for ultrasonic waves, especially as described above, is located between an ultrasound source and the flow meter. This measure advantageously guarantees that the function of the flow meter, which works on the ultrasonic principle, is not influenced by ultrasonic waves from outside sources.

Figure 5:
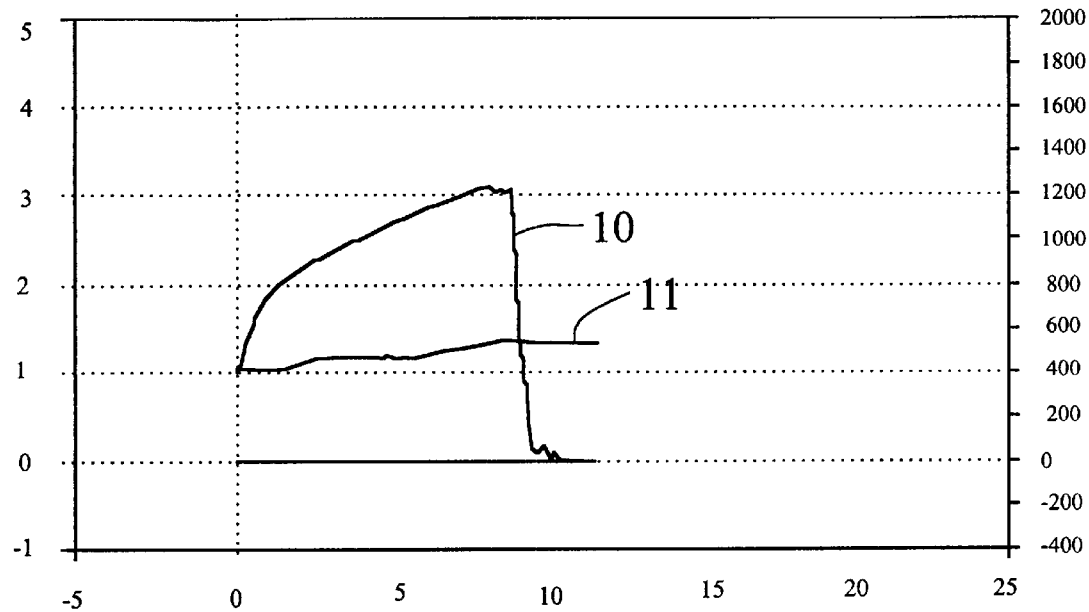
Figure 6:
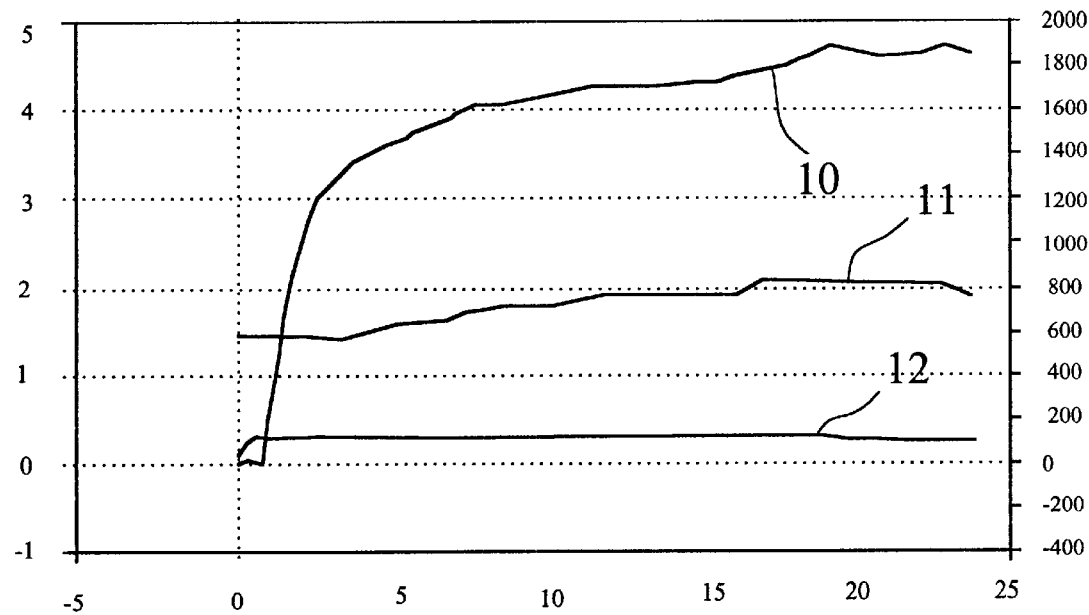

Now there are a number of possibilities for designing and developing the sound damper for ultrasonic waves in a gas flow in accordance with the invention. For this, see on the one hand claims 2 to 11, subordinate to claim 1, and on the other hand, the description of preferred embodiments in connection with the drawings. In the drawings FIG. 1 shows a general sketch of a flow meter that works on the ultrasonic principle, FIG. 2 shows an embodiment of a damping element according to the first teaching of the invention, FIGS. 3a) and 3b) show; a first and a second embodiment of a scattering unit in accordance with the invention, in cross section, FIGS. 3a) and 4b) show a third embodiment of a scattering unit in accordance with the invention in two different views, FIG. 5 shows the output signal of a flow meter that works on the ultrasonic principle, without a sound damper according to the first model of the invention being located between an ultrasound source and the flow meter, and FIG. 6 shows the output signal of a flow meter that works on the ultrasonic principle, in which a sound damper; according to the first teaching of the invention,is located between an ultrasound source and the flow meter.

Figure 2:
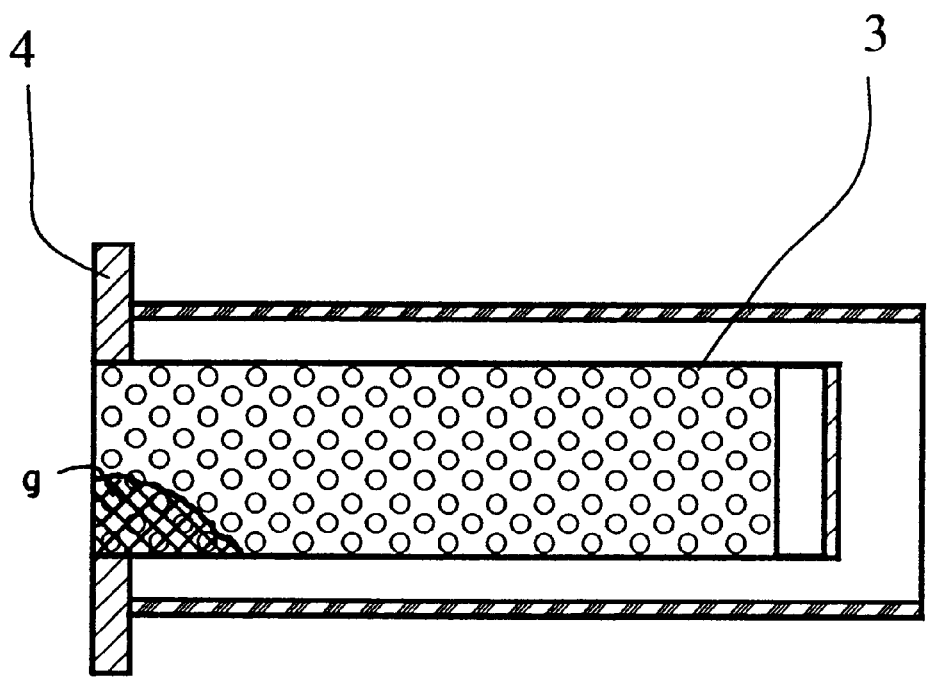

FIG. 1 of the drawings shows a flow meter operating on the ultrasonic principle with two ultrasonic transducers 1,2, one of which in each case emits ultrasonic waves that are received by the other. This takes place alternately, i.e. each of the ultrasonic transducers 1, 2 works alternately as sender and receiver. The speed of the gas flow is found in such a system by the formula $$v = \frac{l}{2 \cdot \cos\beta} \left( \frac{1}{t_{up}} - \frac{1}{t_{down}} \right)$$

where l=the distance between the two ultrasonic transducers 1, 2

β=the angle of propagation of the ultrasonic pulse relative to the direction of the gas flow, $t_{up}$=the propagation time upstream and $t_{down}$=the propagation time downstream.

Given these relations, the following relation obtains for the error in the measurement signal for the flow speed:

$$\delta v = \frac{l}{2 \cdot \cos\beta} \frac{1}{\sqrt{2} \, \pi f} \frac{1}{\sqrt{S/N}}$$

where f=frequency of ultrasonic signal of ultrasonic transducers 1, 2 and

S/N=signal/noise ratio of the measurement signal.

In order to reduce the amplitude of the ultrasonic waves produced by an ultrasonic source, e.g. a throttle valve V, in a gas flow in accordance with the first teaching of the invention and thus achieve an improvement in the signal/noise ratio, a damping element is designed, for example, as a perforated tubular body closed at one end. Such a damping element 3 is shown in FIG. 2. This damping element 3 shown in FIG. 2 is clamped between two connecting flanges of a pipeline, not shown, with its connecting flange 4.

Figure 3:
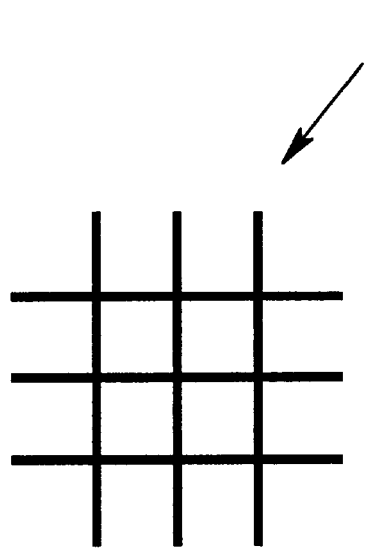
Figure 3:
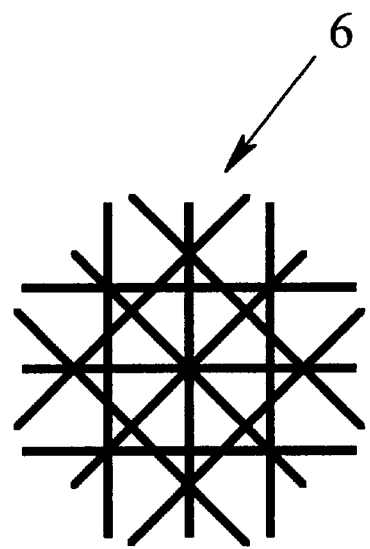

A first embodiment, shown in FIG. 3a), of a scattering unit 5 having open geometric structures pointing from the outside inward, is located on the inside of the damping element 3. This scattering unit 5 is shown in cross section in FIG. 3a) using a cutout. Ideally, the depth of the scattering unit 5 is in the direction of flow within the range of the wavelength of the ultrasonic waves. An alternate second scattering unit 6 is also shown in cross section in FIG. 3b). These scattering units 5,6 can, on one hand, be arranged inside the damping unit as an overall cylindrically designed scattering unit and, on the other hand, as a number of mall scattering units with the same or similar cross sections to fill up the damping element 3 irregularly. Both possibilities can also be used cumulatively. Here it is always important that the highest possible number of small reflective surfaces is in the damping element 3 due to the scattering units 5, 6 located in it.

Also, a layer of gauze may be positioned on and/or in the damping element 3 as indicated at g in FIG. 2.

Figure 4:
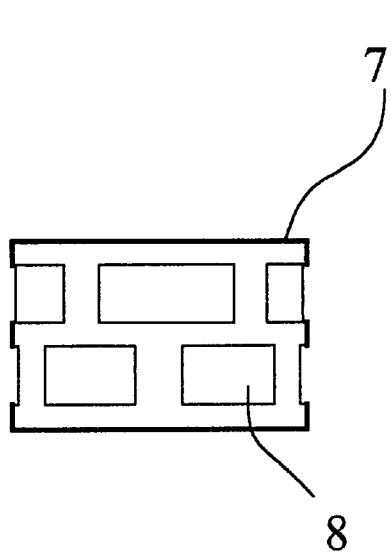
Figure 4:
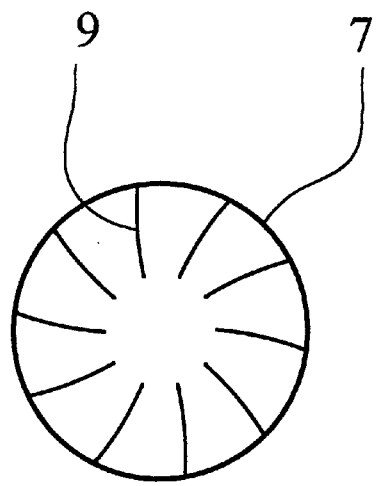

So-called pall rings 7 shown in FIG. 4 are scattering units that have proven particularly suitable for filling up the damping element 3 irregularly. These pall rings 7 are basically cylindrical and preferably have square openings 8 in the cylinder surface. They can be seen particularly well in FIG. 4a). In addition, the pall rings 7 have spoon-shaped, curved guide elements 9 on their inside which lead to the desired eddying of the. gas flow damping the amplitude of the ultrasonic waves. These guide elements 9 can be seen well in FIG. 4b).

A further advantage of a sound damper according to the first teaching of the invention that has not been mentioned yet is the fact that the remaining ultrasonic waves at the outlet of the sound damper emerge very highly scattered, and thus spread out in all directions. Thus, a further reduction in the influence of the ultrasonic waves on, for example, a flow meter, can be achieved by an increased distance between sound damper and flow meter or by ultrasonic transducers with highly direction-dependent receiving characteristics.

FIG. 5 of the drawings shows a measurement signal 10 of a flow meter that works on the ultrasonic principle for the volume flow in m³/h plotted on the right as a function of the time. FIG. 5 also shows the opening 11 of a throttle valve as a function of the time. It can be seen clearly that the measurement signal 10 collapses above a critical value despite the throttle valve being further opened, because the signal/noise ratio has risen too high This is naturally undesirable.

Finally, FIG. 6 of the drawings shows a measurement signal 10 of a flow meter that operates on the ultrasonic principle for the volume flow, in which a sound damper for ultrasonic waves in accordance with the invention is located in the gas flow between the throttle valve as the ultrasound source and the flow meter. It can be seen clearly that the flow meter delivers a perfect measurement signal 10 up to high volume flows. FIG. 6 of the drawings also shows the pressure drop 12 plotted on the left via the sound damper for ulstrasonic waves in accordance with the invention. This pressure drop 12 is approximately 0.5 bar for a volume flow of approximately 2000 m³/h.

What is claimed is:

1. An ultrasonic flow meter comprising ultrasonic transducers, each of said transducers emitting ultrasonic waves that are received by the other, wherein a damping element for ultrasonic waves is located between said ultrasonic transducers, said damping element being composed of a perforated, tubular body closed at one end, being filled with a number of scattering units comprising basically cylindrical pall rings having spoon-shaped, curved guide elements on their insides.

2. The flow meter according to claim 1, wherein said pall rings have square openings in their cylindrical surfaces.

* * * * *